United States Patent [19]

Nakajima et al.

[11] 4,430,518

[45] Feb. 7, 1984

[54] PROTECTING TUBE FOR THERMOCOUPLE

[75] Inventors: Takashi Nakajima, Iwatsuki; Fujio Matsui, Nagareyama, both of Japan

[73] Assignee: Denki Kagaku Kogyo Kabushiki Kaisha, Tokyo, Japan

[21] Appl. No.: 326,100

[22] Filed: Nov. 30, 1981

[51] Int. Cl.³ .............................................. H01L 35/02
[52] U.S. Cl. .................................. 136/234; 29/573; 136/242
[58] Field of Search ................. 29/573; 136/230, 234, 136/242; 374/139

[56] References Cited

U.S. PATENT DOCUMENTS 2,697,734 12/1954 Zvanut ................................. 136/242
4,060,095 11/1977 Kurita ................................. 136/234

Primary Examiner—Leland A. Sebastian
Attorney, Agent, or Firm—Jordan and Hamburg

[57] ABSTRACT

A protecting tube for a thermocouple is provided which comprises an outer shell made of a tubular molded body of boron nitride and an inner sheath made of a tubular molded body of ceramics.

8 Claims, 1 Drawing Figure

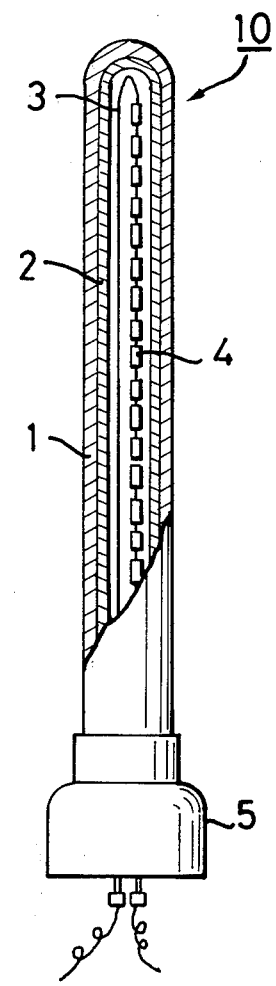
FIG.

PROTECTING TUBE FOR THERMOCOUPLE

BACKGROUND OF THE INVENTION

1. Field of the Invention

This invention relates to a protecting tube for a thermocouple used for measuring a high temperature atmosphere of a gas or a molten metal.

2. Prior Art

The utility of boron nitride at a high temperature atmosphere has hitherto been known and a protecting tube made of boron nitride has been widely used to protect a thermocouple contained therein, since boron nitride withstands an extremely high temperature and is excellent in resistance to thermal shock. Thus, protecting tubes made of boron nitride containing a thermocouple therein have been employed to measure a high temperature gaseous atmosphere of, for example helium or carbon monooxide as well as a molten metal such as copper, silver, magnesium, zinc, aluminium or iron. Boron nitride is advantageous in that it does not react with such molten metal. However, the known boron nitride protecting tube has a disadvantage that boron nitride reacts with platinum, leading to breakdown of the platinum wire when a molded tube of boron nitride is used as the protecting tube for a platinum/platinum-rhodium thermocouple. As a result, the life time of the platinum/platinum-rhodium thermocouple is shortened by the use of a protecting tube made of boron nitride.

Although a thermocouple protecting tube made of alumina having a purity of not less than 99.5% or a composition mainly composed of molybdenum or zirconia has been known, these known materials for protecting tube are not satisfactory in that they are adversely affected by a change in temperature and often to be damaged or broken thereby.

OBJECTS AND SUMMARY OF THE INVENTION

An object of this invention is to provide a protecting tube for a thermocouple which is excellent in resistance to heat, withstands a thermal shock and may be used repeatedly.

Another object of this invention is to provide a protecting tube for a thermocouple which is well adapted for a change in temperature and is not damaged or broken thereby.

A further object of this invention is to provide a protecting tube for a thermocouple having both good spalling resistant property and good corrosion resistant property.

The above and other objects and advantageous features of this invention will be clarified by the following decription.

The protecting tube for a thermocouple provided in accordance with this invention comprises an outer shell made of a tubular molded body of boron nitride and an inner sheath made of a tubular molded body of ceramics.

BRIEF DESCRIPTION OF THE DRAWING

The single FIGURE appended herewith shows a diagrammatical section, partly broken away, of a preferred embodiment of the protecting tube for a thermocouple according to this invention.

PREFERRED EMBODIMENT OF THE INVENTION

Referring to the appended drawing, a protecting tube generally denoted by reference numeral 10 comprises an outer molded tube 1 of boron nitride, and an inner molded tube or sheath 2 of ceramics mounted in contact with the outer molded tube 1. A platinum/platinum-rhodium thermocouple 3 fitted with alumina tubes 4 is loosely inserted into the inner sheath 2, and at the end 5 of the tube 1 the thermocouple 3 is connected, by coupling means such as a bolt-and-nut unit, with a building-out wire which is fixedly mounted at the opening end of the protecting tube 10.

In this invention, the molded tube 1 of boron nitride used as the outer shell is preferably prepared by the steps of molding boron nitride powders at a temperature of higher than 1500° C. while applying a pressure of from 100 to 500 kg/cm$^2$ to form a molded block of hot-pressed boron nitride, cutting out a rod having desired dimensions and shape from the molded block, and boring the rod to form a cylinder. A tubular body or cylinder having a bending strength of from about 600 to 1000 kg/cm$^2$ can be prepared by the aforementioned steps. However, the cylinder may be prepared by other processes. For example, a molded block may be prepared by mixing the boron nitride powders with an inorganic binder, such as aluminium phosphate or colloidal silica, or with an organic binder, such as polyvinyl alcohol or carboxymethyl cellulose, followed by molding and then sintering under atmospheric pressure at a temperature of higher than 1000° C., preferably higher than 1500° C. A cylindrical outer shell 1 may be prepared through cutting-out and boring operations similar to the steps as mentioned above. Although the cylindrical outer shell prepared through the latter-mentioned process has a bending strength of about 100 kg/cm$^2$, it may be satisfactorily used under the condition where the required strength is not so high. Otherwise, a cylindrical body for forming the outer shell may be prepared by the steps of applying a layer of boron nitride over the periphery of a core made of graphite by reacting boron trichloride and ammonia by gas phase reaction, and removing the core.

Irrespective of whether the outer shell 1 is prepared by any of the aforementioned methods, it is desirous that boron nitride constituting the outer shell 1 has a density of 1.7 to 2.2 g/cm$^3$, more preferably 1.75 to 1.85 g/cm$^3$. Generally speaking, the physical properties of the materials called for as a protecting tube for a thermocouple for measuring a high temperature should have both spalling resistant property and corrosion resistant property. However, these properties are contrary each other. That is, if the spalling resistant property is made excellent, then the corrosion resistant property becomes lower and vice versa. It has not been found that these two contrary properties are closely related to the density of the boron nitride used and that the two properties can be well balanced by controlling the density of boron nitride within the range above defined.

A tubular or cylindrical molded body 2 of ceramics used as the inner sheath may be made of a commercially available material. The preferred materials for the inner sheath include alumina, beryllia, silicon nitride, zirconia, silica, thoria, yttria and mixtures thereof, and the most preferred material having the best properties is alumina. The inner sheath may be prepared by mixing powders of any one or more of said materials optionally with a binder, such as low melting point magnesia, yttria or alumina, and sintering or hot-pressing under a pressure of from 50 to 500 kg/cm$^2$ at a temperature of higher than 1000° C., preferably higher than 1500° C.

The protecting tube according to this invention is characterized by the two-layer structure of the wall of the tube, the outer layer being made of boron nitride and the inner layer being made of ceramics. It is desirous that the layers be closely contacted with each other in order to measure the temperature more precisely.

When the protecting tube according to this invention is used for the protection of a platinum/platinum-rhodium thermocouple, there is not a fear that the platinum/platinum-rhodium wire is broken as otherwise occurred when a conventional protecting tube made merely of boron nitride is used. A platinum/platinum-rhodium thermocouple combined with the protecting tube according to this invention can be repeatedly used for more than 200 times to measure the temperature of molten metals or the temperature in furnaces. Although the protecting tube of the aforementioned embodiment is combined with a platinum/platinum-rhodium thermocouple, the other type thermocouples may be contained in the protecting tube of this invention. The protecting tube according to this invention may be used in combination with any of the known thermocouples including chromel-alumel, iron-Constantan and copper-Constantan thermocouples.

Although the present invention has been described with reference to a specific preferred embodiment, various changes, modifications and variations may be made without departing from the spirit of the invention. It is intended that all such changes, modifications and variations be included within the scope of the present invention.

What is claimed is:

1. A protecting tube for a platinum/platinum-rhodium thermocouple, comprising an outer shell made of a tubular molded body of boron nitride having a density of 1.7 to 2.2 g/cm$^3$ and an inner sheath made of a tubular molded body of ceramics, said outer shell and said inner sheath having one end opening to define a port through which the thermocouple is inserted, said outer shell being formed by the steps of molding boron nitride powders at a temperature of higher than 1500° C. while applying a pressure of from 100 to 500 kg/cm$^2$ to form a molded block of boron nitride, cutting out a rod having desired dimensions and shape from said block, and boring said rod to form a cylinder.

2. A protecting tube according to claim 1, wherein said ceramics is selected from the group consisting of alumina, beryllia, silicon nitride, zirconia, silica, thoria, yttria and mixtures thereof.

3. A protecting tube according to claim 1, wherein said inner sheath is formed by sintering ceramics powders with or without a binder at a temperature of higher than 1000° C. while applying a pressure of from 50 to 500 kg/cm$^2$.

4. A protecting tube according to claim 1, wherein said inner sheath is formed by hot-pressing ceramics powders with or without a binder at a temperature of higher than 1000° C. while applying a pressure of from 50 to 500 kg/cm$^2$.

5. In the combination of a platinum/platinum-rhodium thermocouple and a protecting tube therefor, the improvement comprising a protecting tube according to claim 1.

6. In the combination of a platinum/platinum-rhodium thermocouple and a protecting tube therefor, the improvement comprising a protecting tube according to claim 2.

7. In the combination of a platinum/platinum-rhodium thermocouple and a protecting tube therefor, the improvement comprising a protecting tube according to claim 3.

8. In the combination of a platinum/platinum-rhodium thermocouple and a protecting tube therefor, the improvement comprising a protecting tube according to claim 4.

* * * * *